Patented Apr. 10, 1951

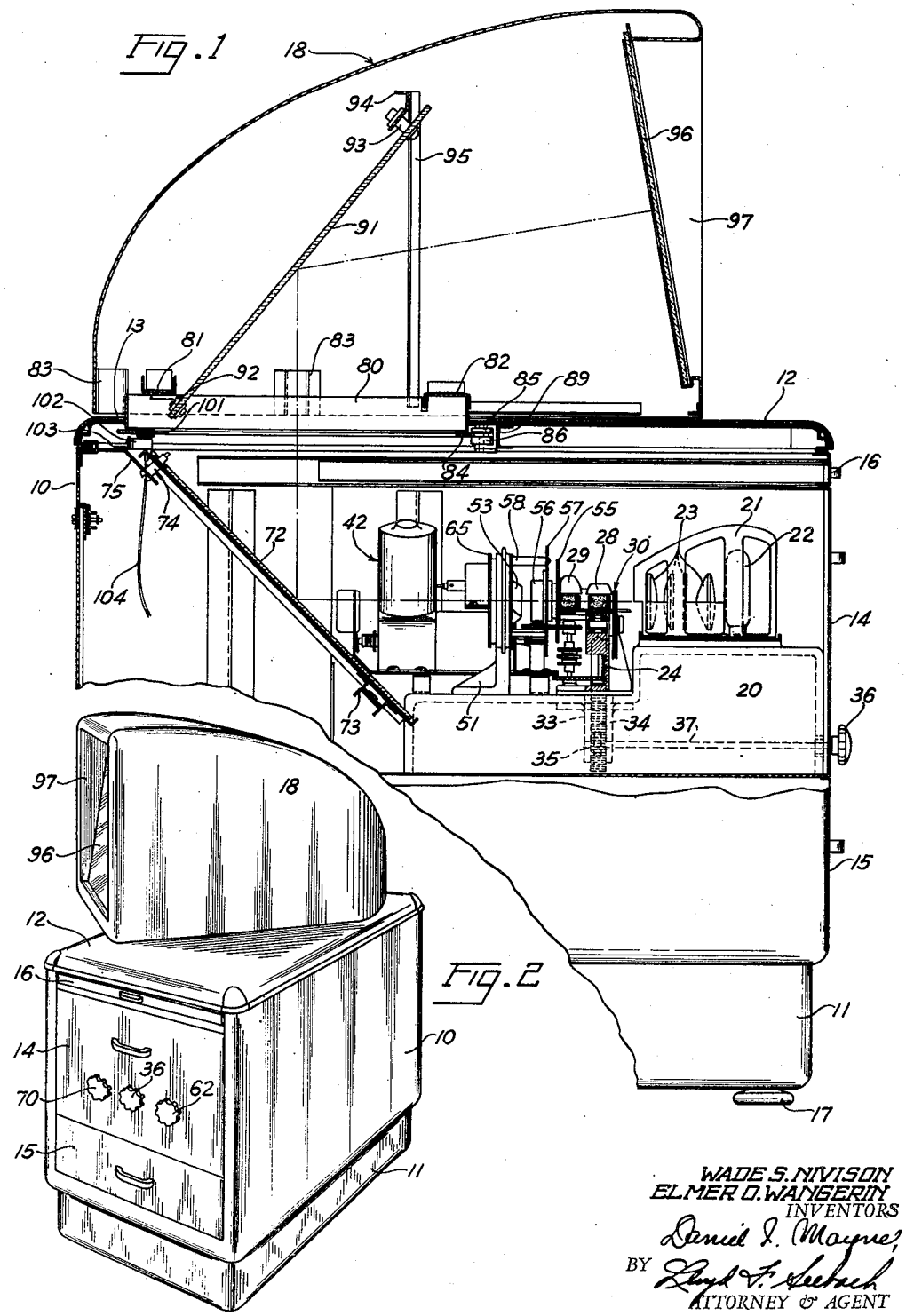

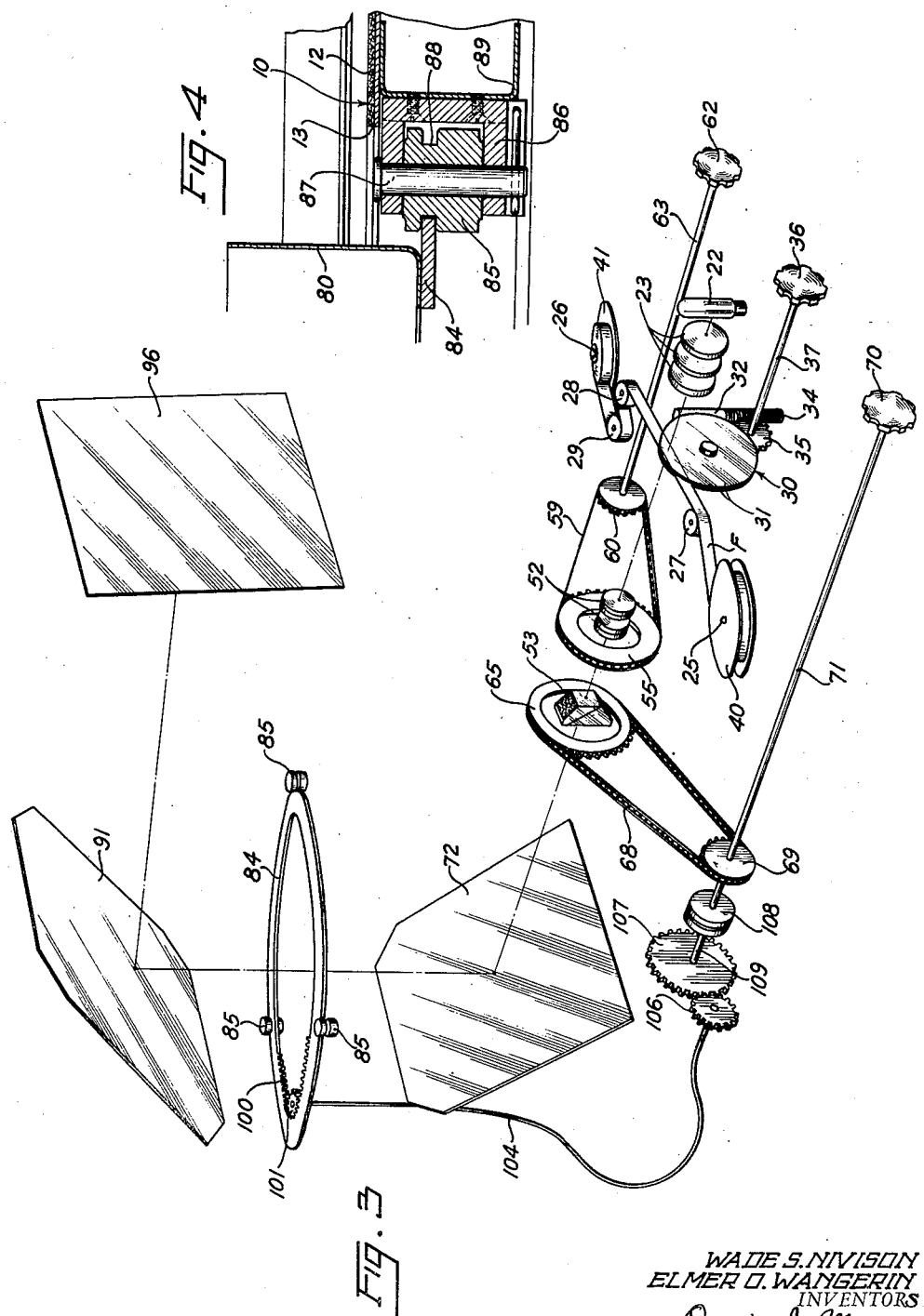

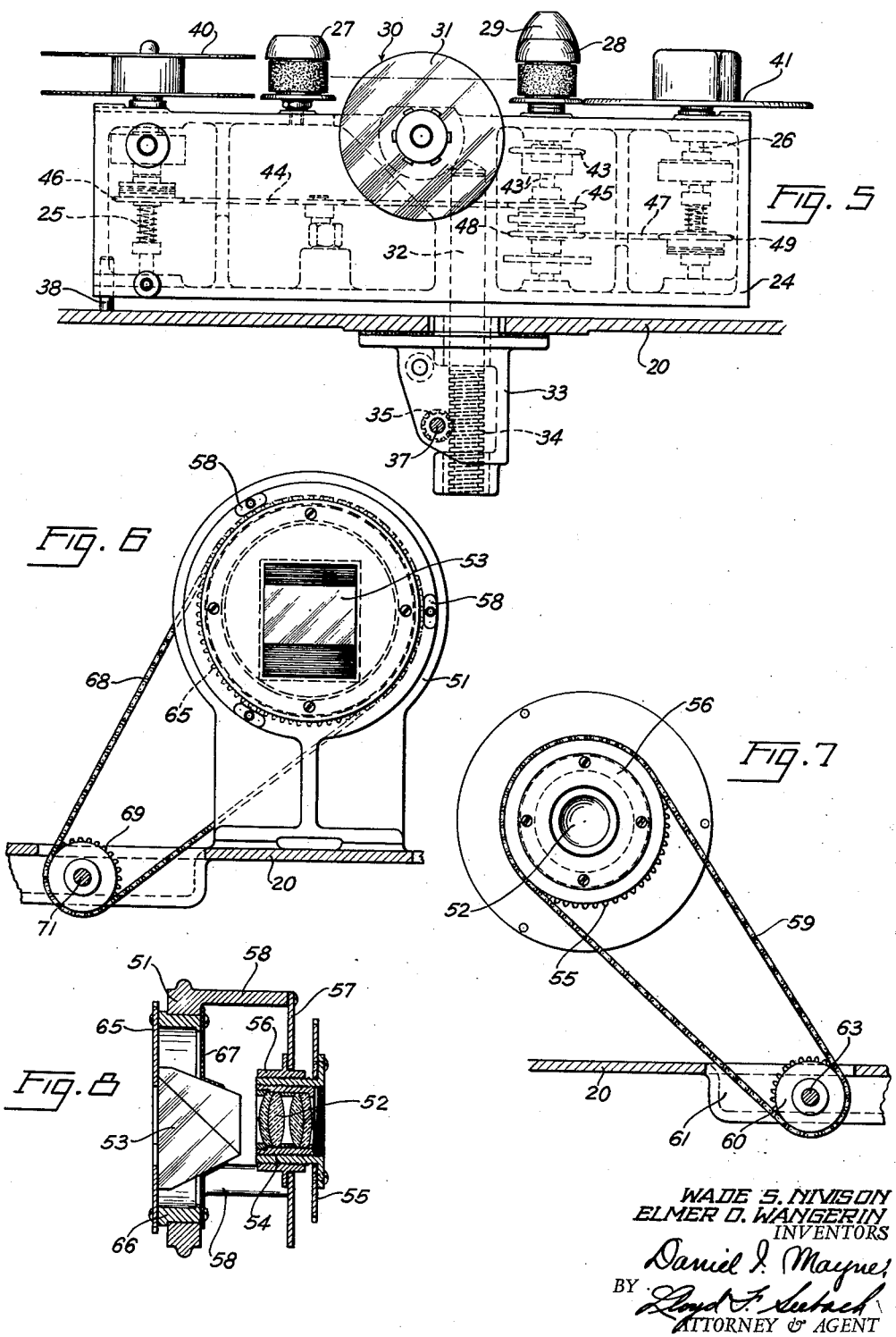

2,548,554

UNITED STATES PATENT OFFICE 2,548,554

PROJECTION VIEWING APPARATUS

Wade S. Nivison, New York, and Elmer O. Wangerin, Rochester, N. Y., assignors to Eastman Kodak Company, Rochester, N. Y., a corporation of New Jersey Application April 28, 1949, Serial No. 90,088

11 Claims. (Cl. 88—24)

This invention relates to photographic viewing apparatus and more particularly to a viewing apparatus in which a turret supporting the image receiving screen is rotatable about an axis for placing the screen in any one of a plurality of positions with respect to the casing on which it is rotatably mounted.

At the present time, micro-film readers are provided with a screen which is usually mounted on the reader casing in a fixed position and, as a result, the person viewing the image projected on the screen has to face the screen and the casing to copy or read the projected image. Where movable screens are provided on film readers, they are usually provided for the sole purpose of obtaining a different magnification of the projected image by increasing the optical path. Further, if the observer is seated at a desk for copying data from the projected document image or images on the screen, then the entire reader must be moved into a position in which the screen is readily visible to the observer.

In the present invention, the screen is carried by a rotatable turret on the top of a casing and is rotatable through a full 360 degrees. The turret can be swung directly into the operator's line of vision for maximum reading efficiency and, as a result, the reader is particularly adapted for making transcriptions and copying data from the projected document images. The casing can be placed, for instance, between two desks for alternate use over either desk by merely rotating the screen turret. Further, to compensate for rotation of the projected image upon rotation of the screen turret, a prism is rotatably mounted in the optical system and operatively connected to the rotatable turret so that the projected image on the screen is maintained erect for all positions of the turret with respect to the casing. A manual adjustment available to the operator on the casing permits an initial erection of the projected image to be made in any position of the turret.

The primary object of the invention, therefore, is to provide a photographic viewing apparatus in which a turret supports a screen and is rotatably mounted on a casing for positioning the screen in any one of a plurality of positions with respect to the casing.

Another object of the invention is to provide a photographic viewing apparatus in which a movable turret is rotatably mounted on a casing about a vertical axis at the rear of the casing and having a reflecting means and screen supported by the turret and rotatable therewith into any one of a plurality of positions with respect to the casing.

Yet another object of the invention is to provide a photographic viewing apparatus in which the image of a film strip is projected longitudinally of a casing and then reflected vertically into a movable turret rotatably mounted on the casing and provided with a reflecting means movable with the turret for directing the reflected image onto a screen which is also supported by said turret.

Still another object of the invention is to provide a photographic viewing apparatus in which a prism is aligned with the optical system and rotatably mounted and operatively connected to a turret which is rotatably mounted on a casing and about a vertical optical axis, whereby rotation of the turret automatically rotates the prism to maintain an erect image on the screen carried by said turret for all positions of the turret with respect to the casing.

A further object of the invention is to provide a photographic viewing apparatus in which an erecting prism is rotatably mounted in alignment with the optical system and operatively connected to a turret rotatably mounted on the casing for automatically rotating said prism upon rotation of said turret and also operatively connected to a manually operable means on the casing for rotating said prism independently of the movement of said turret.

And yet another object of the invention is to provide a photographic viewing apparatus which requires a minimum amount of manipulation by the operator and at the same time provides for maximum reading efficiency.

Other objects and advantages will be apparent to those skilled in the art by the description which follows.

The objects of the invention are embodied in a photographic viewing apparatus comprising an optical system enclosed within a casing and provided with a film gate for holding a film strip therebetween and for projecting an image of the film strip longitudinally of the casing, a fixed reflecting means within the casing for directing the projected image vertically and substantially perpendicular to the optical axis of the optical system, a movable turret rotatably supported on the casing and including at one end thereof a screen and at the other end thereof a reflecting means for receiving and directing the reflected image from said fixed reflecting means to said screen, support members rotatably mounted on said casing for rotatably supporting said turret in any one of a plurality of positions with respect to said casing, a prism rotatably mounted between said optical system and said fixed reflecting means for maintaining an erect image on said screen, a driven member operatively connected to said prism for rotating said prism, a drive means operatively connecting said turret and said driven member for rotating said prism in accordance with the movement of said turret to maintain an erect image on said screen, and a manually operable member on the casing operatively connected to said driven member for rotating said prism independently of said drive means in any position of said turret.

While the present invention is described as being embodied in a film reader for microfilms, it is equally applicable to various other types of photographic film strip viewers or projectors. Thus, the present invention is not to be limited by the illustrated embodiment thereof but has a scope as broad as the interpretation of the claims permits.

Reference is now made to the accompanying drawings wherein like reference numerals designate like parts and wherein:

Fig. 1 is a partial vertical section through a film reader embodying the present invention and showing the relation of the various elements comprising the reader and in which the movable turret is aligned with the casing on which it is rotatably mounted;

Fig. 2 is a perspective view of the reader showing the turret rotated into one of its positions with respect to the casing;

Fig. 3 is a diagrammatic perspective view of the principal elements of the reader and showing particularly the arrangement of the elements for rotating the erecting prism;

Fig. 4 is a vertical section through one of the rotatable members mounted on the casing for rotatably supporting the movable turret;

Fig. 5 is an elevation of the film handling means showing the film supply and take-up reel supports and the drive connecting said supports;

Fig. 6 is an end elevation of the erecting prism mounting means and its supporting means and showing the driven member and the driving connection between said driven member and the prism mounting means;

Fig. 7 is an end elevation of the projection lens mounting means and showing the driving connection for focusing said projecting lens; and Fig. 8 is a vertical section through the erecting prism and projection lens mounting means and showing the arrangement by which each is individually and independently rotated.

In the illustrated embodiment of the invention a casing 10, see Figs. 1 and 2, is supported upon a base structure 11 and has a top 12 provided with an aperture 13 at the rear thereof. A mechanism drawer 14 and a film storage drawer 15 are slidably mounted for withdrawal from casing 10 in a manner similar to that of well-known filing cabinets or the like. A shelf 16 is mounted under top 12 and is adapted to be withdrawn from casing 10 in a well-known manner. The casing 10 is supported on a plurality of feet 17 which are adjustable with respect to base 11 so that the top 12 may be aligned with the top of a desk or table to permit turret 18 to be moved thereover in a manner and for a purpose to be described hereinafter.

The mechanism drawer 14 has mounted therein a base member 20 at the forward end of which is mounted a lamp housing 21 containing the lamp 22 and the condenser lens system 23. The film handling means, see Fig. 5, comprises a support member 24 on which is mounted the film supply spindle shaft 25, take-up spindle shaft 26, the idler film rollers 27 and 28, the driven film roller 29 and the film gate 30 which comprises two glass flats 31 which are rotated by the film strip as it is moved therebetween. The support member 24 is supported on the post 32 which is mounted in bracket 33 secured to base member 20 and is provided at the lower end with a circular rack 34 which engages a pinion 35. Knob 36 on the outside of drawer 14 is connected to pinion 35 by shaft 37 and rotation of said knob serves to raise or lower the film handling means as a unit with respect to the optical axis and base member 20 for scanning the film strip. The support member 24 is prevented from rotating by stud 38 on base member 20 which slidably engages a suitable aperture in said support member.

The film strip F is moved from supply reel 40 on spindle 25, around film roller 27, between the glass flats 31, around film roller 28, around the driven roller 29 and to the take-up reel 41, see Figs. 3 and 5. A motor drive, indicated broadly by the numeral 42 in Fig. 1, is connected to sprocket 43 on the driven film roller shaft 43' for driving the film strip in either direction between glass flats 31. Chain 44 connects sprocket 45 on shaft 43' to sprocket 46 on shaft 25 for driving supply reel 40, and chain 47 connects sprocket 48 on shaft 43' to sprocket 49 on shaft 26 for driving the take-up reel 41.

Bracket 51, which is secured to the base member 20, supports the mounts for the projection lens 52 and the erecting prism 53, see Figs. 6-8. The projection lens 52 is mounted in a sleeve 54 to which is secured the sprocket 55 and which is threaded into a sleeve 56 secured to plate 57 which, in turn, is secured to the extensions 58 of bracket 51. Sprocket 55 is connected by chain 59 to sprocket 60 mounted in a well 61 in base member 20. Knob 62 on the drawer 14 is connected to sprocket 60 by the shaft 63 and rotation of said knob rotates the sprocket 55 to move sleeve 54 with respect to sleeve 56 for focusing the projection lens.

The optical means or erecting prism 53 is a Schmidt-Z-type prism, see Figs. 3 and 8, and is held against the apertured sprocket 65 and in sleeve 66 by the retaining plate 67, the sleeve 66 being rotatable in bracket 51. Sprocket 65, which is secured to sleeve 66, is connected by chain 68 to the sprocket 69 journalled in the support member 20. Knob 70 on the drawer 14 is connected to sprocket 69 by shaft 71 and rotation of said knob rotates prism 53 for a purpose to be described hereinafter. It will be noted from Figs. 1 and 3 that the axis of the optical system extends longitudinally of the casing until it strikes the fixed reflecting means or mirror 72 which is supported at its lower end on the U-shaped member 73 extending across casing 10 and at its upper end on the adjustable stud 74 which is mounted on the angle member 75 also secured to casing 10. The mirror 72 reflects the projected image vertically and substantially at right angles to the optical axis through the aperture 13 and into the turret 18, see Fig. 1.

Since the film reader is particularly adapted for making transcriptions or copying data from the projected document image appearing on the screen, the operator is usually seated at a desk or table. By mounting the optical projecting system and film handling means within the drawer 14, the changing of film reels and threading of the film can be very easily accomplished by the operator in a seated position by merely pulling the drawer outwardly in which position the film reels, lamp housing, etc., are readily available. Also, since the mirror 72 is mounted on casing 10, movement of drawer 14 outwardly will increase the length of the optical path and, hence, the projected image will be magnified. The drawer 14, therefore, serves two useful purposes; namely, it provides a convenient manner of housing the optical system and film handling means within casing 10, and it provides a structure by means of which the projected image can be readily magnified.

The movable turret 18 is of the shape disclosed in Figs. 1 and 2 and is provided with an open bottom and a cylindrical sleeve 80, the cross-section of which is best disclosed in Fig. 4. The sleeve 80 is supported from the turret 18 by the angle members 81 and 82 secured to the walls of the turret and spaced from the turret by spacers 83, the sleeve 80 being welded or secured in some other suitable manner to said members and spacers. As noted in Figs. 1 and 4, the sleeve 80 extends through aperture 13 in top 11 and into casing 10 and has fixed to the lower end thereof an annular plate 84. Arranged around the aperture 13 and about the vertical optical axis within casing 10 are a plurality of rollers 85 which are rotatably mounted on the bracket 86 by the pin 87, see Figs. 1, 3, and 4. Each roller 85 is provided with a recess 88 for receiving the annular plate 84, as disclosed in Fig. 4, and each bracket 86 is secured to a U-shaped member 89 secured to top 12. The rollers 85, therefore, rotatably support turret 18 for movement about the vertical optical axis and in any position of turret 18 with respect to casing 10.

A second reflecting means or mirror 91 is supported in the turret 18 and is mounted at its lower end on an angle member 92 secured to member 81 and adjustably mounted at its upper end by means of stud 93 to the brace member 94 fixed to the vertical L-shaped member 95. Mirror 91 reflects the vertically reflected image from mirror 72 to the screen 96 mounted in the forward end of turret 18. The mirror 91 and screen 96 are movable with the turret 18, and screen 96 is inclined at an angle and set back from the front of the turret so that the forward end of turret 18 forms a hood 97 for preventing extraneous light from falling onto the screen.

As turret 18 is rotated, the mirror 91 is also rotated and, as a result the image on the screen is rotated. The projected image may be erected on the screen by turning knob 70 and rotating the prism 53. However, this means that each time the operator moves turret 18, the image appearing on the screen must be erected by rotating knob 70. To overcome this difficulty, the annular plate 84 is provided on its inner periphery with gear teeth 100 which may be cut around only a portion of the inner periphery, as shown in Fig. 3, or around the entire inner periphery. A pinion 101 is mounted within casing 10 in bracket 102 which is secured to the angle bracket 103 on member 75 and meshes with the internal gear teeth 100. A flexible drive member 104 transmits the rotary motion imparted to pinion 101 by movement of turret 18 to a gear train comprising gear 106 and gear 107 and also permits withdrawal of drawer 14 without having to provide a telescoping connection between pinion 101 and the gear system movable with drawer 14. The driven member or sprocket 69 is fixed to shaft 71 which terminates in the driven member of friction clutch means 108, and gear 107 is fixed to shaft 109 connecting said gear to the driving member of clutch means 108. Clutch means 108 is a friction clutch of the type wherein the driving force of the clutch can be readily adjusted. From the structure just described, it can be readily appreciated that rotation of turret 18 will rotate prism 53 through the drive connecting the annular member 84 and the sprocket or driven member 69. The ratio of the drive from the annular gear or plate 84 to the sprocket 65 being such that the prism will rotate at one-half the angular speed of mirror 91 and, hence, at one-half the angular speed of turret 18, the prism 53 being rotated in a clockwise direction when the turret 18 is rotated in a counter-clockwise direction, and vice versa.

With this arrangement, the projected image will always be erect on screen 96 regardless of the direction of rotation of turret 18. The clutch 108 is inserted between the drive means connecting annular member 84 and shaft 109 and the driven member or sprocket 69 to permit rotation of prism 53 through knob 70 independently of the movement of turret 18, the clutch means 108 being so adjusted that rotation of knob 70 will rotate prism 53 but will not rotate the turret through said clutch means. The projected image, therefore, is always maintained erect upon rotation of the turret and may be erected in any position of said turret with respect to the casing in the event that the document images on the film strip are not arranged in the same relative position.

Since other modifications of the invention are possible, the scope of the invention is not to be limited to the illustrated embodiment but is defined by the appended claims.

Having now particularly described our invention, what we desire to secure by Letters Patent of the United States, and what we claim is:

1. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction, a movable turret rotatably mounted on said casing and including a screen at one end thereof and a reflecting means within said turret and for directing the reflected image from said fixed reflecting means to said screen, means on said casing for rotatably supporting said turret in any one of a plurality of positions with respect to said casing, an optical means rotatably mounted between said optical system and said fixed reflecting means for rotating the projected image in its own plane to provide an erect image on said screen, and means operatively connecting said turret and said optical means and operable upon rotation of said turret for rotating said optical means to maintain an erect image on said screen for all positions of said turret.

2. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction, a movable turret rotatably mounted on said casing and including a screen at one end thereof and a reflecting means within said turret and for directing the reflected image from said fixed reflecting means to said screen, means on said casing for rotatably supporting said turret in any one of a plurality of positions with respect to said casing, an optical means rotatably mounted between said optical system and said fixed reflecting means for rotating the projected image in its own plane to provide an erect image on said screen, a drive means operatively connecting said turret and said optical means and operable upon rotation of said turret for rotating said optical means in accordance with the rotation of said turret to maintain an erect image on said screen for all positions of said turret, and a manually-operable means on said casing operable in any position of said turret and operatively connected to said optical means for rotating said optical means independently of said drive means.

3. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction, a movable turret rotatably mounted on said casing and including a screen at one end thereof and a reflecting means within said turret and for directing the reflected image from said fixed reflecting means to said screen, means on said casing for rotatably supporting said turret in any one of a plurality of positions with respect to said casing, an optical means between said optical system and said fixed reflecting means for rotating the projected image in its own plane to provide an erect image on said screen, a mounting means for rotatably supporting said optical means, a driven member operatively connected to said mounting means for rotating said optical means, and a drive means operatively connecting said turret and said driven member and operable upon rotation of said turret for rotating said optical means in accordance with the rotation of said turret to maintain an erect image on said screen for all positions of said turret.

4. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction, a movable turret rotatably mounted on said casing and including a screen at one end thereof and a reflecting means within said turret and for directing the reflected image from said fixed reflecting means to said screen, means on said casing for rotatably supporting said turret in any one of a plurality of positions with respect to said casing, an optical means between said optical system and said fixed reflecting means for rotating the projected image in its own plane to provide an erect image on said screen, a mounting means for rotatably supporting said optical means, a driven member operatively connected to said mounting means for rotating said optical means, a drive means operatively connecting said turret and said driven member and operable upon rotation of said turret for rotating said optical means in accordance with the rotation of said turret to maintain an erect image on said screen for all positions of said turret, and a manually-operable means on said casing operable in any position of said turret and operatively connected to said driven member for rotating said optical means independently of said drive means.

5. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction, a movable turret rotatably mounted on said casing and including a screen at one end thereof and a reflecting means within said turret and for directing the reflected image from said fixed reflecting means to said screen, means on said casing for rotatably supporting said turret in any one of a plurality of positions with respect to said casing, an optical means between said optical system and said fixed reflecting means for rotating the projected image in its own plane to provide an erect image on said screen, a mounting means for rotatably supporting said optical means, a driven member operatively connected to said mounting means for rotating said optical means, a drive means operatively connecting said turret and said driven member and operable upon rotation of said turret for rotating said optical means in accordance with the rotation of said turret to maintain an erect image on said screen for all positions of said turret, a manually-operable means on said casing operable in any position of said turret and operatively connected to said driven member for rotating said optical means independently of said drive means, and a clutch means between said drive means and said driven member for permitting rotation of only said optical means upon actuation of said manually-operable means.

6. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image along an optical axis perpendicular to said first-mentioned optical axis, a movable turret rotatably mounted on said casing for movement about said perpendicular optical axis and including an annular gear member fixed thereto, a screen supported at one end of said turret, a reflecting means within said turret and rotatable therewith for directing the reflected image from said fixed reflecting means to said screen, a plurality of support members rotatably mounted on said casing and adapted to engage said gear member for rotatably supporting said turret in any one of a plurality of positions with respect to said casing, an anti-rotation prism between said optical system and said fixed reflecting means, a mounting means for rotatably supporting said prism, a driven member operatively connected to said mounting means for rotating said prism, a drive means operatively connecting said gear member and said driven member and operable upon rotation of said turret for rotating said prism to maintain an erect image on said screen for all positions of said turret.

7. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image along an optical axis perpendicular to said first-mentioned optical axis, a movable turret rotatably mounted on said casing for movement about said perpendicular optical axis and including an annular gear member fixed thereto, a screen supported at one end of said turret, a reflecting means within said turret and rotatable therewith for directing the reflected image from said fixed reflecting means to said screen, a plurality of support members rotatably mounted on said casing and adapted to engage said gear member for rotatably supporting said turret in any one of a plurality of positions with respect to said casing, an anti-rotation prism between said optical system and said fixed reflecting means, a mounting means for rotatably supporting said prism, a driven member operatively connected to said mounting means for rotating said prism, a drive means operatively connecting said gear member and said driven member and operable upon rotation of said turret for rotating said prism to maintain an erect image on said screen for all positions of said turret, and a manually-operable means on said casing operable in any position of said turret and operatively connected to said driven member for rotating said optical means independently of said drive means.

8. In a photographic viewing apparatus, the combination with a casing, an optical system within said casing including a film gate for supporting a film strip therebetween and having an optical axis extending longitudinally of said casing and for projecting an image of said film strip therealong, of a fixed reflecting means within said casing for directing said projected image along an optical axis perpendicular to said first-mentioned optical axis, a movable turret rotatably mounted on said casing for movement about said perpendicular optical axis and including an annular gear member fixed thereto, a screen supported at one end of said turret, a reflecting means within said turret and rotatable therewith for directing the reflected image from said fixed reflecting means to said screen, a plurality of support members rotatably mounted on said casing and adapted to engage said gear member for rotatably supporting said turret in any one of a plurality of positions with respect to said casing, an anti-rotation prism between said optical system and said fixed reflecting means, a mounting means for rotatably supporting said prism, a driven member operatively connected to said mounting means for rotating said prism, a drive means operatively connecting said gear member and said driven member and operable upon rotation of said turret for rotating said prism to maintain an erect image on said screen for all positions of said turret, a manually-operable means on said casing operable in any position of said turret and operatively connected to said driven member for rotating said optical means independently of said drive means, and a clutch means between said drive means and said driven member for permitting rotation of only said prism upon actuation of said manually-operable means.

9. In a photographic viewing apparatus, the combination with a casing having a top wall provided with an aperture at one end thereof, and an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction through said aperture, a movable turret on said casing including a cylindrical member having an end thereof fixed to said turret and extending through said aperture into said casing and an annular gear member fixed to the other end of said member, a screen at one end of said turret, a reflecting means within said turret and rotatable therewith for directing the reflected image from said fixed reflecting means to said screen, a plurality of support members arranged around said aperture and rotatably mounted on said casing and adapted to engage said annular gear member for rotatably supporting said turret in any one of a plurality of positions with respect to said casing, an anti-rotation prism aligned with and between said optical system and said fixed reflecting means, a mounting means for rotatably supporting said prism, a driven member operatively connected to said mounting means for rotating said prism, a drive means operatively connecting said annular gear member and said driven member and operable upon rotation of said turret for rotating said prism in accordance with the rotation of said turret to maintain an erect image on said screen for all positions of said turret.

10. In a photographic viewing apparatus, the combination with a casing having a top wall provided with an aperture at one end thereof, and an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction through said aperture, a movable turret on said casing including a cylindrical member having an end thereof fixed to said turret and extending through said aperture into said casing and an annular gear member fixed to the other end of said member, a screen at one end of said turret, a reflecting means within said turret and rotatable therewith for directing the reflected image from said fixed reflecting means to said screen, a plurality of support members arranged around said aperture and rotatably mounted on said casing and adapted to engage said annular gear member for rotatably supporting said turret in any one of a plurality of positions with respect to said casing, an anti-rotation prism aligned with and between said optical system and said fixed reflecting means, a mounting means for rotatably supporting said prism, a driven member operatively connected to said mounting means for rotating said prism, a drive means operatively connecting said annular gear member and said driven member and operable upon rotation of said turret for rotating said prism in accordance with the rotation of said turret to maintain an erect image on said screen for all positions of said turret, and a manually-operable means on said casing operable in any position of said turret and operatively connected to said driven member for rotating said prism independently of said drive means.

11. In a photographic viewing apparatus, the combination with a casing having a top wall provided with an aperture at one end thereof, and an optical system within said casing including a film gate for supporting a film strip therebetween and having an optical axis extending longitudinally of said casing and for projecting an image of said film strip therealong, of a fixed reflecting means within said casing for directing said projected image in a substantially vertical direction through said aperture, a movable turret on said casing including a cylindrical member having an end thereof fixed to said turret and extending through said aperture into said casing and an annular gear member fixed to the other end of said member, a screen at one end of said turret, a reflecting means within said turret and rotatable therewith for directing the reflected image from said fixed reflecting means to said screen, a plurality of support members arranged around said aperture and rotatably mounted on said casing and adapted to engage said annular gear member for rotatably supporting said turret in any one of a plurality of positions with respect to said casing, an anti-rotation prism aligned with and between said optical system and said fixed reflecting means, a mounting means for rotatably supporting said prism, a driven member operatively connected to said mounting means for rotating said prism, a drive means operatively connecting said annular gear member and said driven member and operable upon rotation of said turret for rotating said prism in accordance with the rotation of said turret to maintain an erect on said screen for all positions of said turret, a manually-operable means on said casing operable in any position of said turret and operatively connected to said driven member for rotating said prism independently of said drive means, and a clutch means between said drive means and said driven member for permitting only rotation of said prism upon actuation of said manually-operable means.

WADE S. NIVISON.
ELMER O. WANGERIN.

REFERENCES CITED

The following references are of record in the file of this patent:

UNITED STATES PATENTS

| Number | Name | Date |
|---|---|---|
| 1,826,680 | Stuber | Oct. 6, 1931 |
| 2,177,638 | Draeger | Oct. 31, 1939 |
| 2,488,239 | Rattray | Nov. 15, 1949 |